3,127,310
NOVEL FEEDING-DETERRENT COMPOSITIONS
Donald Perry Wright, Jr., Pennington, N.J., assignor to American Cyanamid Company, New York, N.Y., a corporation of Maine
No Drawing. Filed Sept. 15, 1961, Ser. No. 138,269
1 Claim. (Cl. 167—30)

This invention relates to novel feeding-deterrent compositions and to methods for their utilization in protecting agricultural crops and products, as well as organic and related articles from attack by birds, mammals or insects. More particularly, the present invention relates to novel feeding-deterrent compositions containing 4,4'-methylenebis(N-methyl-N-nitrosoaniline) as the active ingredient and methods for deterring pests from feeding on or otherwise damaging seeds, plants, cellulose, wool and other organic and related articles.

A host of insecticides and rodenticides is known for the protection of agricultural crops and products. Many of them are effective against insects and other pests. However, they are not entirely satisfactory, for the reason that beneficial predators and pollinators are often killed along with the harmful insects. A material that would protect the crop from harmful insects while not harming the beneficial insects, would be desirable. Further, many of the known rodenticides are highly toxic to mammals. To provide a material which possesses low mammalian toxicity while preventing damages by rodents would also be desirable.

It is, therefore, an object of the present invention to provide a chemical composition which, when applied to seeds or plants, will deter insects from feeding on seeds or plants.

It is a further object to provide chemical compositions which when applied to various materials, such as cellulose, wool or other organic matter, will act to deter or prevent insects, mammals and birds from feeding on or destroying such materials.

It is a further object of the present invention to minimize damage to stored articles, such as grain, fruit and the like, by impregnating or coating the container with the composition of the invention to render the container unappetizing, and thus to protect its contents.

Another object is to provide a process for creating an unappetizing feeding environment for insects, rodents and the like.

Other objects and advantages will become apparent to those skilled in the art from a consideration of the ensuing description.

According to the present invention, above objects are achieved in the provision of compositions containing 4,4'-methylenebis(N - methyl - N - nitrosoaniline). These compositions are highly effective in preventing or deterring food intake by insects, mammals and the like.

Advantageously, the 4,4'-methylenebis(N-methyl-N-nitrosoaniline) compound is readily synthesized. Method for its preparation is known as disclosed by Crowley et al., Journal Chemical Society (London), 1940, pp. 1286–1289.

In general, it is preferred to incorporate the active methylenebis(N-methyl-N-nitrosoaniline) compound in a variety of suitable carriers or diluents. As one advantage of the invention, the feeding-deterrent compound is effective in extremely dilute concentrations. Compositions can be prepared as a solution by dissolving the active compound in a suitable solvent such as water/acetone or alcohol mixture. They can also be prepared either as a suspension in either a suitable non-solvent for the active compound or as a dust. Suspensions or dispersions of the aniline compound in a carrier, such as water, are useful in the treatment of plant foliage. The active compound may also be conveniently applied by the aerosol method. In the latter utilization, the active compound can be directly dissolved in a highly volatile liquid carrier, such as dischlorodifluoromethane under pressure, or the compound can be dissolved in a lesser volatile solvent, such as benzene, and this solution admixed with a highly volatile liquid aerosol carrier.

Feeding-deterrent dusts may be prepared by mixing the active methylenebis(N-methyl-N-nitrosoaniline) compound with dusting materials, as for example clay, pyrophyllite, pumice, fuller's earth, activated carbon and bentonite. Thus, seed can be protected from insects by incorporating the active aniline compound into a solid carrier while admixing seeds with the feeding-deterrent composition as by tumbling.

Although a wide weight range of desired compound to inert carrier or diluent may be used, it has been found that a percentage range of from about 0.01% to about 25% of active ingredient, and preferably about 1% to about 5% is adequate for most aqueous dispersion preparations. However, as a dust composition, not more than about 5% of active ingredient is satisfactory for most applications.

The compositions of the present invention may advantageously contain any compatible commercially available dispersing agent for the feeding-deterrent compound when it is employed in an aqueous suspension. Illustrative examples of such dispersing or surface active agents include: the fatty acid esters of polyhydric alcohols, the sodium salt of polymerized propyl naphthalene sulfonic acid, as for instance surface active compounds formed by condensing formaldehyde with propyl naphthalene sodium sulfonate, the alkylaryl polyether alcohols, and the ethylene oxide addition products of the latter. Usually, from one to five parts per hundred parts of deterrent compound is a good operating range.

While the composition of the present invention can be used either as a powder or as a liquid, other active ingredients may be added thereto to prepare a multi-purpose preparation. Such other active ingredients can be added as the carrier per se or, in addition, an inert carrier can also be used. These active ingredients in admixture can be parasiticides, fertilizers and the like. Thus, an effective dose of an aniline compound and an insecticide, such as malathion, can be employed as a multi-purpose preparation.

The invention will be illustrated in conjunction with the following examples which are to be taken as illustrative only and not by way of limitation. All parts are by weight, unless otherwise noted.

EXAMPLE 1

The antifeeding properties of the methylenebisaniline compound are determined by testing the compound against the Southern armyworm (*Prodenia eridania*), the Mexican bean beetle *Epilachna varivestis*) and also against laboratory white rats. In the test involving the Southern armyworm, the compound is dissolved in a mixture of 65% acetone and 35% water. Sieva lima bean leaves are dipped in the test solution. When dried, they are infested with one third-instar armyworm larva per leaf and held for two days at 80° F. and 60% relative humidity. Tests are read after two days holding; observations being made of mortality, feeding damage, and migration of larvae from treated leaves. For the Mexican bean beetle the test procedure is the same as for the Southern armyworm but one third-instar bean beetle per leaf is used. In the white rat test, laboratory white rats are supplied with 100 grams of treated food in individual cages, three rats per dose being used. The rats are supplied water for drinking. Daily measurements are made of weight change of rats, amount of food consumed, and gross appearance of rats. Normal rats of the size used (90–100 grams) consumed 12–15 grams per day of untreated food. The data obtained are shown in the following table.

*Table I*

| Pest | Concentration | Percent Kill | Feeding [1] |
|---|---|---|---|
| Armyworm | .1 | 0 | T |
|  | .03 | 0 | T–L |
|  | .01 | 0 | L–M |
|  | .003 | 0 | S |
| Bean Beetle | .1 | 0 | T |
|  | .03 | 0 | L |
|  | .01 | 0 | M–S |

| | | | Percent Inhibition |
|---|---|---|---|
| Rats | 1.0 | 0 | 77 |
|  | .2 | 0 | 62 |

[1] T=trace feeding damage=<5%; L=light feeding damage=5–10%; M=moderate feeding damage=10–20%; S=severe feeding damage=>20%.

EXAMPLE 2

A piece of white wool 2″ x 1″ is soaked in an acetone solution of the test compound and allowed to dry. It is then placed in a Petri dish with 20 large (½″) larvae of the black carpet beetle (*Attagenus piceus*). The test is held for 14 days at 80° F. and observations made of feeding damage and the weight of the droppings (a measure of the amount of feeding). There are no deaths. Results are recorded in the table below.

*Table II*

| | Solution Concentration, Percent | Damage | Corrected mg. Droppings per 20 Larvae [1] |
|---|---|---|---|
| Untreated | | Severe | 44.5 |
| Methylenebis-(N-methyl-N-nitrosoaniline) | 2.0 | Trace | 11.5 |
|  | 1.0 | Trace | 8.9 |
|  | .5 | Light | 11.7 |
|  | .1 | Light | 21.5 |
|  | .05 | Moderate | 27.3 |

[1] Corrected for 1.3 mg. of droppings per 20 starved larvae.

EXAMPLE 3

One-pound brown paper bags are soaked in acetone solutions of the test compound, dried and half-filled with whole wheat flour and sealed. Twenty adult lesser grain borers (*Rhyzopertha dominica*) are added and observations made at 7 days are recorded below.

*Table III*

| | Solution Concentration, percent | Holes Bored in bag | Beetles Entering bag |
|---|---|---|---|
| Untreated | | 1 | 3 |
| Methylenebis(N-methyl-N-nitrosoaniline) | 5.0 | 0 | 0 |
|  | 1.0 | 0 | 0 |
|  | .5 | 0 | 0 |

EXAMPLE 4

This example illustrates the efficacy of the methylenebisaniline compound as a feeding deterrent for mammals under field conditions.

Sufficient 4,4′ - methylenebis(N - methyl - N - nitrosoaniline) is admixed with carefully sized white wheat to provide 2% by weight of the kernel. Native deer mice, live-trapped from the wild are employed for the purpose. Ten individually caged mice are offered twenty-five kernels of the treated wheat each day for ten consecutive days.

In the ten animals tested, there is noted a 85.6% reduction in food intake.

Similar results are noted when 1.5% of the feed deterrent compound are initially admixed with 98.5% inert clay carrier therefor and the mixture is then applied to the white wheat kernel in amounts sufficient to provide 2% of the active compound based on the overall weight of the seed employed.

EXAMPLE 5

The procedure of Example 4 is followed in every detail except that the concentration of the test compound is increased to 3% and the test animals are chipmunks.

It is noted that the overall percent reduction in food intake is 88.4%.

I claim:

A method for the protection of organic materials susceptible to attack by insects based on the desire for the organic materials as food, which comprises: applying to said organic material a preparation comprising a major amount of an inert carrier for a feeding-deterrent compound and a minor amount of that compound, said compound being 4,4′-methylenebis(N-methyl-N-nitrosoaniline).

References Cited in the file of this patent

Crowley et al.: Jour. Chem. Soc. (London), 1940, pp. 1286–9.

Bellack et al.: Chemical-Biological Coordination Center, Review No. 5, National Research Council, Washington, D.C., 1953.

Chemical Abstracts, vol. 48, page 941–d, 1954 (abstract of De Witt et al., J. Am. Phar. Assoc., 42:695–7, 1953).